United States Patent [19]

Segal

[11] Patent Number: 5,680,437
[45] Date of Patent: Oct. 21, 1997

[54] SIGNALING SYSTEM SEVEN DISTRIBUTED CALL TERMINATING PROCESSOR

[75] Inventor: Niranjan Nath Segal, Arlington, Tex.

[73] Assignee: Motorola, Inc., Schaumburg, Ill.

[21] Appl. No.: 658,044

[22] Filed: Jun. 4, 1996

[51] Int. Cl.⁶ .......................... H04M 3/08; H04M 7/00; H04M 11/00; H04J 1/16
[52] U.S. Cl. .................. 379/10; 370/217; 370/244; 379/32; 379/34; 379/56; 379/230
[58] Field of Search ........................... 379/1, 9, 10, 14, 379/15, 32, 34, 56, 57, 207, 221, 229, 230; 370/241, 242, 244, 250, 251, 216, 217, 218, 221, 351, 352

[56] References Cited

U.S. PATENT DOCUMENTS

| | | | |
|---|---|---|---|
| 5,048,081 | 9/1991 | Gavaras et al. | 379/230 |
| 5,457,729 | 10/1995 | Hamann et al. | 379/34 |
| 5,563,930 | 10/1996 | Pester, III | 379/22 |

*Primary Examiner*—Curtis Kuntz
*Assistant Examiner*—Paul Loomis
*Attorney, Agent, or Firm*—James A. Lamb

[57] ABSTRACT

A distributed SS7 call terminating processor (102) for processing calls received over an SS7 network (105) includes a set of N simultaneously active digital channel interfaces (DCIs) (121) sharing a common signaling point code. The set of DCIs (121) receives common channel signaling messages. Each of the N simultaneously active DCIs (258) includes an SS7 message transfer part level one (MTPL1) physical layer (259) coupled on a one to one basis to a common channel signaling link (110), an SS7 message transfer part level two (MTPL2) link layer (256) and an SS7 message transfer part level three (MTPL3) network layer (253) having the common signaling point code. An operation and maintenance controller (108) includes a configuration function (315) that configures each SS7 MTPL3 network layer (253) in the set of N simultaneously active DCIs (121) to have the common signaling point code.

5 Claims, 3 Drawing Sheets

SIGNALING SYSTEM SEVEN DISTRIBUTED CALL TERMINATING PROCESSOR

RELATED APPLICATIONS

Application Ser. No. 08/627,540, filed Apr. 4, 1996 by Segal, entitled "DISTRIBUTED SIGNALING SYSTEM SEVEN CALL HANDLING SYSTEM."

FIELD OF THE INVENTION

This invention relates in general to telephone networks and in particular to networks employing Signaling System Number 7 Common Channel Signaling.

BACKGROUND OF THE INVENTION

Common channel signaling (CCS) systems are used in telephone networks to improve their efficiency in handling telephone traffic. CCS is a method of controlling telephone networks using a single channel to convey information between telephone exchanges relating to call setup and call supervision of calls being connected on other channels, as well as transmission physicality maintenance and management. The CCS systems are implemented with redundancy to ensure reliable signaling communication in the event of transmission physicality failure.

Signaling System Number 7 (SS7) provides an international standard for CCS systems that is suitable for telephone exchanges, PBXs and Wireless Messaging Gateways (WMG). In its implementation, SS7 follows the lower three layers of the OSI seven layer model. In the case of an SS7 signaling network, typically one channel of a minimum of two different inter exchange physical circuits are used to convey CCS information between exchanges. The two circuits are typically routed by a minimum of two different physical paths and often these paths are routed through remote exchanges or Signal Transfer Points, allowing for alternate routing in the event of interruption of service due to equipment failure or physical damage.

The SS7 message transfer part level one (MTPL1) is the lowest, physical layer. The MTPL1 includes the electrical interface to the network and controls the data signal timing and electrical characteristics. In the SS7 case these functions conform to the requirements of the inter exchange digital transmission channel and are typically a part of the digital channel interface.

The SS7 message transfer part level two (MTPL2) is the link layer. The MTPL2 includes the link control functions, such as delineation of signal units, packets, by flags, error detection and correction, detection of signal link failure and signaling link recovery procedures.

The SS7 message transfer part level three (MTPL3) is the network layer. Functions included in the MTPL3 are directing a message to the proper routes, evenly distributing the packets over the redundant routes, sending and receiving information regarding network status, and controlling network configuration to preserve or restore normal message transfer capability.

The architecture of existing SS7 exchanges relies on a centralized highly complex fault tolerant processing system employing complex software algorithms to provide the MTPL2 link and the MTPL3 network layers, and fault tolerance for the MPTL3 network layers. These architectures are highly integrated and closely coupled with the message transfer part (MTP) lower level interfaces and tend to be very difficult to expand. Therefore they must be carefully sized to avoid a large initial cost for signaling systems of small or medium size while at the same time providing some capacity for growth. However, when the capacity is exceeded, the exchange typically must be essentially completely replaced with one having a larger capacity. Furthermore, in systems such as paging systems in which calls are only terminated from a public switched telephone network (PSTN), and none are originated to the PSTN, the standard highly integrated architectures are complicated by the necessity of handling both call origination and termination.

What is needed for such terminating only exchanges is an easily expandable modular distributed architecture that includes a simple method of providing system expansion of an SS7 call terminating processor (exchange) with a high degree of reliability.

A related technique which achieves an easily expandable distributed architecture that includes a cost effective method of providing system expansion of an SS7 call originating and terminating processor is described in application Ser. No. 08/627,540, filed Apr. 4, 1996 by Segal, entitled "DISTRIBUTED SIGNALING SYSTEM SEVEN CALL HANDLING SYSTEM."

DETAILED DESCRIPTION OF THE DRAWINGS

Figure 1:
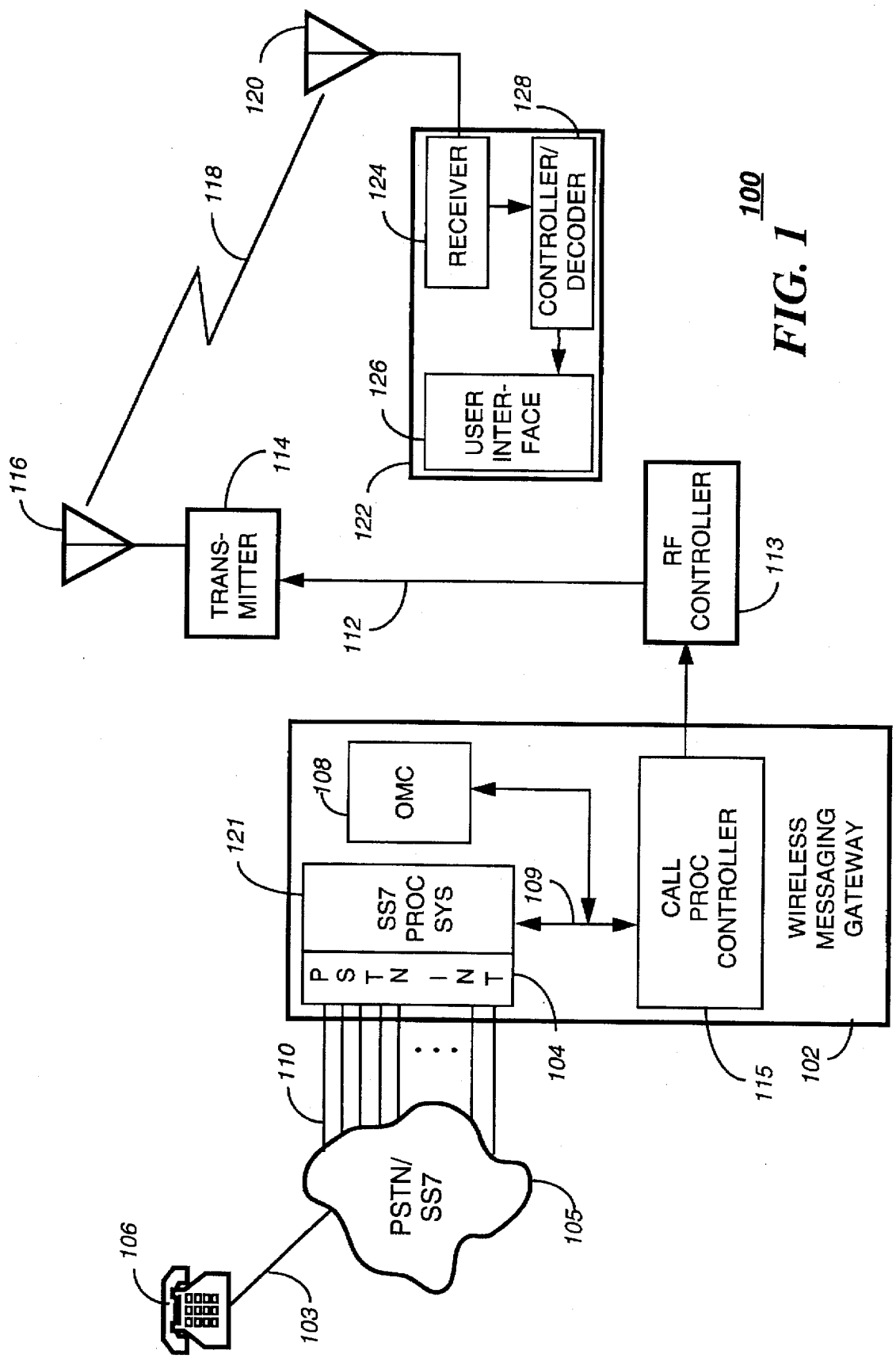
FIG. 1 is an electrical block diagram of a radio communication system, in accordance with the preferred embodiment of the present invention.

Referring to FIG. 1, an electrical block diagram of a radio communication system 100, is shown, in accordance with the preferred embodiment of the present invention. The radio communication system 100 is preferably a Wireless Messaging System, such as a paging system, which can be one way or two way wireless communication system. The radio communication system 100 comprises a message input device, such as a telephone 106, connected to a public switched telephone network controlled by signaling system 7 common channel signaling (PSTN/SS7) 105 by a telephone link 103. The PSTN/SS7 105 is coupled to a wireless messaging gateway (WMG) 102 via telephone links 110. The WMG 102 is coupled to a radio frequency (RF) controller 113 that is coupled to a radio frequency transmitter 114 via a communication link 112. A base station antenna 116 is coupled to the transmitter 114. The radio frequency transmitter 114 is in turn coupled to a subscriber unit 122 via the base station antenna 116, a radio frequency signal 118, and a subscriber antenna 120 that is coupled to the subscriber unit 122. Although the embodiment of the present invention is shown in a WMG 102 it will be appreciated that the present invention can be utilized in other equipment as well, for example a telephone exchange, telephone remote switching equipment and a private branch exchange. In accordance with the preferred embodiment of the present invention, the telephone links 110 utilize common channel signaling (CCS) and signaling system 7 (SS7) protocol.

The WMG 102 comprises a PSTN interface 104, a signaling system seven (SS7) processing system 121, a call processing controller 115, and an operation and maintenance controller (OMC) 108. The telephone links 110 couple to the PSTN interface 104. Each of the telephone links 110 is preferably either a US T1 circuit (having 24 channels each conveying 64 Kbits/second of binary information, such as digitally encod common channel signal), a V.35 synchronous serial interface at 56 or 64 Kbits/second, or a European E1 circuit (32 channels each conveying 64 Kbits/second of binary information and a common channel signal), each of which is well known to one of ordinary skill in the art. The PSTN interface 104 provides electrical termination for the T1 or E1 trunk and couples the common channel signaling (CCS) information to the SS7 processing system 121. The SS7 processing system 121 provides complete SS7 CCS processing functions for the call, and couples the message information, such as the caller's phone number and the paging identification number, to the call processing controller 115, over a high speed local area network 109, which is preferably an Ethernet local area network. The Ethernet 109 also intercouples the SS7 processing system 121 and the call processing controller 115 with the OMC 108. The call processing controller 115 is also coupled to the RF controller 113. In accordance with the preferred embodiment of the present invention, no messages are generated by the WMG 102 for delivery to the PSTN/SS7 105 using the PSTN interface 104. This restriction allows the use of a unique combination of electronic hardware and functions in the PSTN/SS7 105, described in more detail below, for receiving messages from the PSTN/SS7 105, which are expandable in a very cost effective manner.

The OMC 108 provides operational and maintenance control of the WMG 102 during system setup and while the system is running. The OMC 239 also acquires system statistics, failure reports, and alarms from the system elements. The OMC 239 is a programmed function that preferably runs on a SPAR™ 10/20 CPU, running under a Solaris™ Operating System. The OMC 239 function includes unique aspects described below with reference to FIG. 3, as well as conventional functions such as standard communication, statistical, and user interface functions.

The WMG 102, primarily by functions of the call processing controller 115, oversees the operation of one or more radio frequency transmitters 114, through one or more communication links 112. The communication links 112 are typically twisted pair telephone wires, but can also be RF, microwave, or other communication links. The radio frequency transmitter 114 is coupled to the base station antenna 116. It will be appreciated, that in order to meet the requirements of different systems, the radio frequency transmitter 114 may or may not be collocated with the WMG 102.

The subscriber unit 122 is, by way of example, a conventional selective call receiver such as a Bravo Express™ pager manufactured by Motorola, Inc. of Schaumburg, Ill. The subscriber unit 122 comprises the radio frequency receiver 124 coupled to a subscriber antenna 120. The radio frequency receiver 124 is coupled to a controller/decoder 128 that is in turn coupled to a user interface 126. The user interface 126 provides the interface between the user and the subscriber unit 122. The user interface 126 comprises buttons and other controls for the user to enter commands and messages to the controller/decoder 128. The user interface may further comprise alerting devices, such as an alert tone generator, a light emitting diode (LED) indicator, and/or a graphic display to alert the user of pertinent information, and amplifiers and transducer devices to convey voice information to the user.

A paging system user communicating a message to a subscriber unit 122 initiates, by way of example, the communication using the telephone 106. Upon entering the appropriate digits, the user is coupled to the WMG 102 via the telephone link 103, PSTN/SS7 105 and telephone links 110. The WMG 102 then prompts the user to enter a message. It will be appreciated that the message can be, for example a numeric message, alpha numeric message or a voice message. When the message is received the SS7 processing system 121 communicates with the call processing controller 115 to determine from a subscriber data base (not shown) managed by the call processing controller 115 whether the subscriber unit 122 designated in the message is active in the wireless message system, and what type of subscriber unit 122 it is, for example a tone only pager, a voice pager, a numeric pager, or an alphanumeric pager. When the subscriber unit 122 is determined to be active, the call processing controller 115 determines the system identification number (ID) of the subscriber unit 122, and communicates the pager type back to the SS7 processing system 121 which interacts with the PSTN/SS7 105 call originator in a manner determined by the subscriber unit 122 type to acquire appropriate information from the PSTN/SS7 105 call originator. When the information has been acquired, the SS7 processing system 121 passes the information to the call processing controller 115, which includes the system ID in a message and couples the message to the RF controller 113, where it is placed in a queue. At an appropriate time the RF controller 113 encodes the message in a conventional manner and the encoded message is forwarded to the radio frequency transmitter 114 via the communication links 112 for transmission. The encoded message is conveyed from the radio frequency transmitter 114 to the radio frequency receiver 124 in the subscriber unit 122 via the radio frequency signal 118 using the base station antenna 116 and the subscriber antenna 120. The radio frequency receiver 124 couples the encoded message to the controller/decoder 128 which decodes the message, stores the message and alerts the user of the subscriber unit 122 using the user interface 126. The user of the subscriber unit 122 then enters a request for the controller/decoder 128 to convey the message to the user, using the user interface 126. The controller/decoder 128 then presents the message in a suitable manner, for example, using an alpha numeric display for an alpha numeric message.

Figure 2:
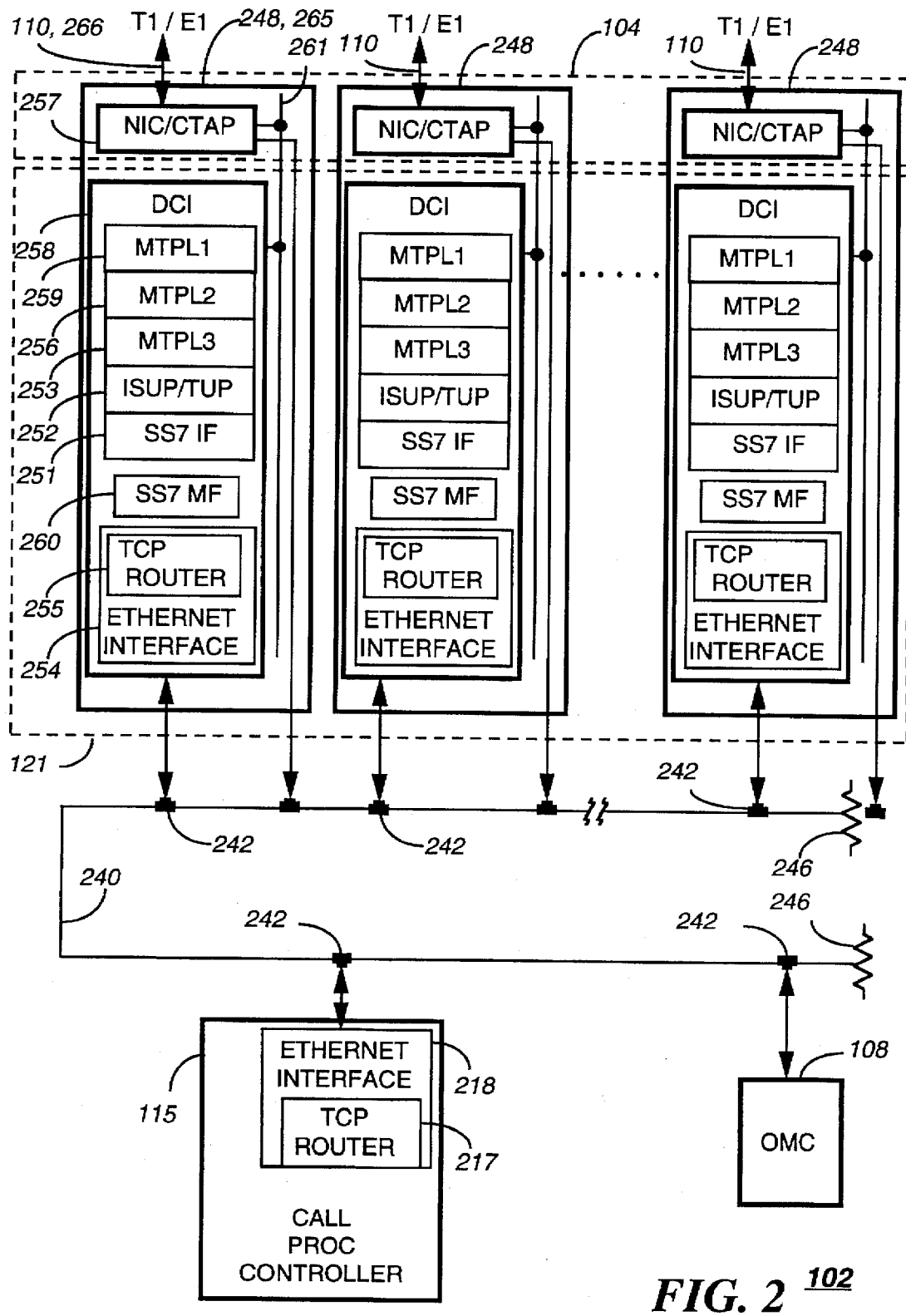
FIG. 2 is an electrical block diagram of a wireless messaging gateway distributed signaling system 7 call handling system, which is a portion of the radio communication system shown in FIG. 1, in accordance with the preferred embodiment of the present invention.

Referring to FIG. 2, an electrical block diagram of the WMG 102 is shown, in accordance with the preferred embodiment of the present invention. The WMG 102 is a SS7 distributed call terminating processor, comprising two or more universal communication controllers (UCC) 248, a call processing controller 115 and the OMC 108, coupled to each other through the expandable local network 109, which in this example is an Ethernet 240, via network taps 242. Each end of the Ethernet 240 is terminated by a network terminator 246. Each UCC 248 comprises a network interface controller/PSTN call termination application program (NIC/CTAP) 257 and a digital channel interface (DCI) 258. Each NIC/CTAP 257 is preferably coupled to one of the T1 or the E1 trunk lines 110. In accordance with the preferred embodiment of the present invention, a maximum of one 64 Kbit/second channel of each T1 or E1 trunk is used as a CCS channel. The PSTN interface 104 comprises the one or more NIC/CTAP 257 which are coupled to the telephone links 110. The SS7 processing system 121 comprises a set of N DCIs 258, where N is an integer greater than 1. The SS7 distributed call terminating processor 102 thus comprises as few as two DCI 258, an OMC 108, and a call processing controller 115. The SS7 distributed call terminating processor 102 (WMG 102) can be expanded as needed to accommodate more SS7 signaling channels by simply adding more DCI 258 modules. Thus, the SS7 distributed call terminating processor 102 is a unique distributed and robust system for handling multiple terminating telephone calls using an architecture which is easily expandable to process additional SS7 signaling channels, and which provides redundancy without complex or costly software or hardware.

Each UCC 248 preferably comprises one NIC/CTAP 257 and one data channel interface (DCI) 258. The NIC/CTAP 257 and the DCI 258 are coupled to each other by a conventional pulse code modulation (PCM) bus 261, such as the signal computing (SC) bus, well known to one of ordinary skill in the art, for conveying the CCS information from the NIC/CTAP 257 to the DCI 258. The PCM bus 261 carries all the digitized channels of the T1 or E1 trunk to other modules in the UCC 248 for use by other functions (not shown). The PCM bus 261 of each DCI 258 is preferably interconnected with the PCM bus 261 of the other DCIs 258, allowing routing of the digitized voice messages from any of the NIC/CTAP's 257, and thereby from any of the T1/D1 trunks.

Each DCI 258 comprises a message transfer part level 1 (MTPL1) 259 physical layer function, a message transfer part level 2 (MTPL2) 256 link layer function, a message transfer part level 3 (MTPL3) 253 network layer, an integrated services digital network (ISDN) and telephony user part (ISUP/TUP) 252 function, a SS7 interface part (SS7 IP) 251, an SS7 monitor function 260, and a Ethernet interface 254, also called a network interface 254. The Ethernet interface 254 comprises a conventional TCP router 255 for controlling the routing of message segments passed over the Ethernet 240. The Ethernet interface 254 is coupled to the Ethernet 240.

Each UCC 248 preferably comprises a conventional rack mounted PC chassis providing power for the NIC/CTAP 257 and DCI 258. The NIC/CTAP 257 is a conventional PC™ compatible computer module manufactured by Dialogic, of Parsippany, N.J. The NIC/CTAP 257 provides conventional conversion between the TI or E1 physical layer and signaling protocol and the pulse code modulated (PCM) signal distributed internally on the PCM bus 261. The NIC/CTAP 257 further provides conventional call termination and handling, such as paging origination calls made by users over the PSTN/SS7 105 which are terminated at the WMG 102. The DCI 258 is a preferably a PC™ compatible printed circuit board module based on the SDB2 module, part number 72178G06 manufactured by Motorola, Inc. of Schaumburg, Ill. The SDB2 module uses a unique combination of a 68360 model processor manufactured by Motorola, Inc. of Schaumburg, Ill. and an Ethernet transceiver integrated circuit (IC) (commonly available from several manufacturers) interconnected with conventional computer components such as random access memory (RAM) and read only memory (ROM), although other processor module configurations which are typically more complex could alternatively be used. The SDB2 module has been designed to have a PCM bus structure compatible with the serial communication bus of the Network Interface Controller. The SS7 message transfer part level one (MTPL1) 259 physical layer, the SS7 message transfer part level two (MTPL2) 256 link layer the SS7 message transfer part level three (MTPL3) 253 network layer and the ISUP/TUP 252 are conventional programmed functions running on the 68360 processor, preferably under a VxWORKS™ operating system (OS). The VxWORKS™ OS is distributed by Wind River Systems of Alameda, Calif. The TCP router 255 function is provided by a conventional TCP/IP built-in stack also running on the 68360 under the VxWORKS™ OS, and which controls the Ethernet transceiver IC. The SS7 interface 251 and the SS7 monitor function (MF) 260 are unique software functions running on the 68360 under the VxWORKS™ OS.

The call processing controller 115 comprises an Ethernet interface 218, also called a network interface. The Ethernet interface 218 includes a TCP router 217 which controls the operation of a conventional Ethernet integrated circuit (IC).

The call processing controller 115 comprises conventional computer system hardware, preferably a processor such as VME SPARC™ model 10/20 central processing unit (CPU) manufactured by Themis Computer of Fremont, Calif.; one or more mass storage units such as conventional hard disk drives; one or more conventional Ethernet and/or Fiber Digital Data Interfaces (FDDI), and appropriate conventional cabinetry and power supplies. A Solaris™ Operating System, which is distributed by Sun Microsystems, Inc. of Mountain View, Calif. is preferably used for controlling the programmed functions of the call processing controller 115. The TCP router function 217 is provided by a conventional TCP/IP built-in stack running on the Solaris™ Operating System, and which controls the Ethernet transceiver IC.

It will be appreciated that the local network 240 can be of an alternative type, such as FDDI, in which case a different transceiver IC and correspondingly different software is used in both of the Ethernet interfaces 254, 218.

It will be appreciated that alternative processor hardware and operating systems could be used to provide the functions described herein, although perhaps being more costly.

For the purpose of explanation by way of example, an incoming SS7 CCS message from a distant switching center, a CCS message to alert the WMG 102 that a paging system user is attempting to establish a voice telephone call to the WMG 102 using a voice telephone circuit of the telephone links 110 arrives on a CCS channel associated with link 266 and is coupled to the NIC/CTAP 257 module within DCI 265. This message, which contains the voice telephone circuit information as well as an originating point code (OPC), a destination point code (DPC), and the subscriber unit ID (which may look like a phone number) is communicated using a standard SS7 messaging envelope. The OPC and DPC are included in a standard SS7 label portion of the SS7 messaging envelope. SS7 messaging envelopes sent using the MTPL1, 2, and 3 layers are sent as multiple data packets over the data links 110 when the amount of information included therein exceeds predetermined limits. The data packet or packets are received by the DCI 258 wherein the packets are decoded and reassembled by the MTP level one, two and three protocol functions. The MTPL3 network layer 253 determines whether the DPC received in the CCS message matches a signaling point code (SPC) which is stored in the MTPL3 network layer 253. When, as in this case, it does match, and the MTPL3 network layer determines that the message is a signaling message, the reassembled CCS message is coupled by the ISUP/TUP 252 to the NIC/CTAP 257, wherein a determination is made by the CTAP that subscriber information is needed from the call processing controller 115. The NIC/CTAP 257 couples the message to the call processing controller 115 via the Ethernet 240. The packets are received by the Ethernet interface 218 of the call processing controller 115. The call processing controller 115 uses the CCS message for determining from a subscriber data base what type of subscriber unit (pager) is being targeted for the message. In this example, the pager is determined to be a numeric pager. The call processing controller 115 communicates this information along with the message information back to CTAP through the Ethernet interface 240, and the CTAP 257 connects to the voice telephone circuit identified in the CCS message to handle the call appropriately, which in this case involves sending a voice prompt to the caller and recovering digits entered by the caller. In another example, in which the pager is a voice pager, the handling of the voice telephone circuit would involve the recovery and storage of voice information from the caller—typically in digitized form. When the telephone call has been completed, the information is routed back to the call processing controller 115 from the NIC/CTAP 257 which is connected to the voice telephone circuit identified in the CCS message, for communication to the subscriber unit 122 via the RF controller 113 and the transmitter 114. The functions described in the above example are functions which could be provided by conventional SS7 MTPL1, 2 and 3 layer functions combined with an SS7 interface function designed for interfacing to a call processing controller 115 of a WMG 102. However, when conventional SS7 exchanges are used, there is a restriction that each MTPL3 network layer 253 have a signaling point code (SPC) unique from the SPC of all other MTPL3 network layers 253 in the same network (e.g., a nationwide network). This restriction is required to enable non-ambiguous origination of CCS signaling messages from the signaling point (telephone exchange).

The SS7 CCS message received by the WMG 102 in the above example is a signaling message, which communicates information concerning a telephone circuit of the telephone network, such as links to be used for a voice link in the telephone network, from one signaling point to another in the SS7 network associated with the telephone network. A second type of message, called a network management message, is also sent between signaling points. This type of message is used for network management functions such as signaling-traffic management messages, which are for reconfiguring the routing of CCS messages for the purposes of leveling the CCS message traffic load between available links, and signaling link management messages, which control the signaling links. An example of a signaling traffic management message are "changeover" and "changeback" messages, which divert and revert CCS messages to and from an alternative signaling link. Other examples of signaling link management messages are "signaling link activation" and "signaling link deactivation," which are used when making a signaling link ready for CCS message traffic.

In a conventional telephone exchange, there exists but one instance of an MTPL3 having any one SPC, which is highly integrated into the complete call processing system (exchange). The one instance of MTPL3 is typically configured to handle a plurality of CCS message links. However, the exchange is typically complex and expensive. When capacity beyond that available in the one instance of MTPL3 is exceeded, the only means of expansion is to add an additional instance of MTPL3 by adding a complete SS7 exchange, which is typically quite costly and typically not an incremental increase in capacity, but rather a large increase in capacity In accordance with the preferred embodiment of the present invention, the WMG 102 exchange is unique in that, 1) although the MTPL3 network layer program functions are conventional, a set of N DCIs 258 each comprising a MTPL3 network layer 253 are simultaneously active, 2) each of the plurality of MTPL3 network layers 253 is configured with an SPC which is common to all the active MTPL3 network layers 253 in a WMG 102, 3) each DCI 258, which comprises one MTPL3 network layer coupled on a one for one basis to an MTPL2 link layer, which is coupled on a one to one basis to an MTPL1 physical layer, is coupled on a one to one basis to a CCS link, and 4) the plurality of MTPL3 network layers 253 are managed by an OMC 108 that configures the SPC's of the simultaneously active MTPL3 network layers 253 to the common SPC. These unique aspects of the WMG 102 provide a cost effective, incremental technique of expanding the capacity of the WMG 102 when the WMG 102 only terminates calls received from an STN/SS7 network 105. This can be done because the DCI 258 can be designed to be a low cost module of lesser capacity than a typical conventional SS7 exchange having one instance of MTPL3 258. A further unique aspect of the WMG 102, in accordance with the preferred embodiment of the present invention, is that the OMC 108 responds to certain of the network management messages received by the MTPL3 network layers 253 and the OMC 108. For example, when a link fails, a remote exchange sends a CCS network management message via an alternative link. The CCS network management message received by a conventional telephone exchange having one instance of MTPL3 would normally be received by the same MTPL3 network layer managing the failed link, via an alternative link that the MTPL3 also manages. In accordance with the preferred embodiment of the present invention, the CCS network management message is received by a second MTPL3 network layer 253 of a second DCI 258 that is connected to the alternative link. When this happens, the second MTPL3 does not respond to the CCS network management message. Instead, the MTPL3 network layer communicates the received CCS network management message to the OMC 108, which processes it for presentation to an operator (more fully described below). This approach to network management can result in temporary loss of certain CCS messages that are partially communicated to the WMG 102 when a link fails, and the probability of such occurrences can be reduced very cost effectively by expanding the WMG 102 incrementally, using additional DCIs 258. Thus, a high degree of fault tolerance can be achieved in the WMG 102, with less complexity than in conventional exchanges.

To further enhance the performance of the WMG 102, each DCI 258 includes a monitor function 260 that generates a periodic heartbeat message that is routed through the Ethernet interface 254 to the OMC 108. When the OMC detects a lost heartbeat, the OMC 108 responds appropriately, as more fully described below, which, for example, can include configuring a standby DCI 258 and activating it to replace a failed DCI 258. This further enhances the reliability of the WMG 102.

Figure 3:
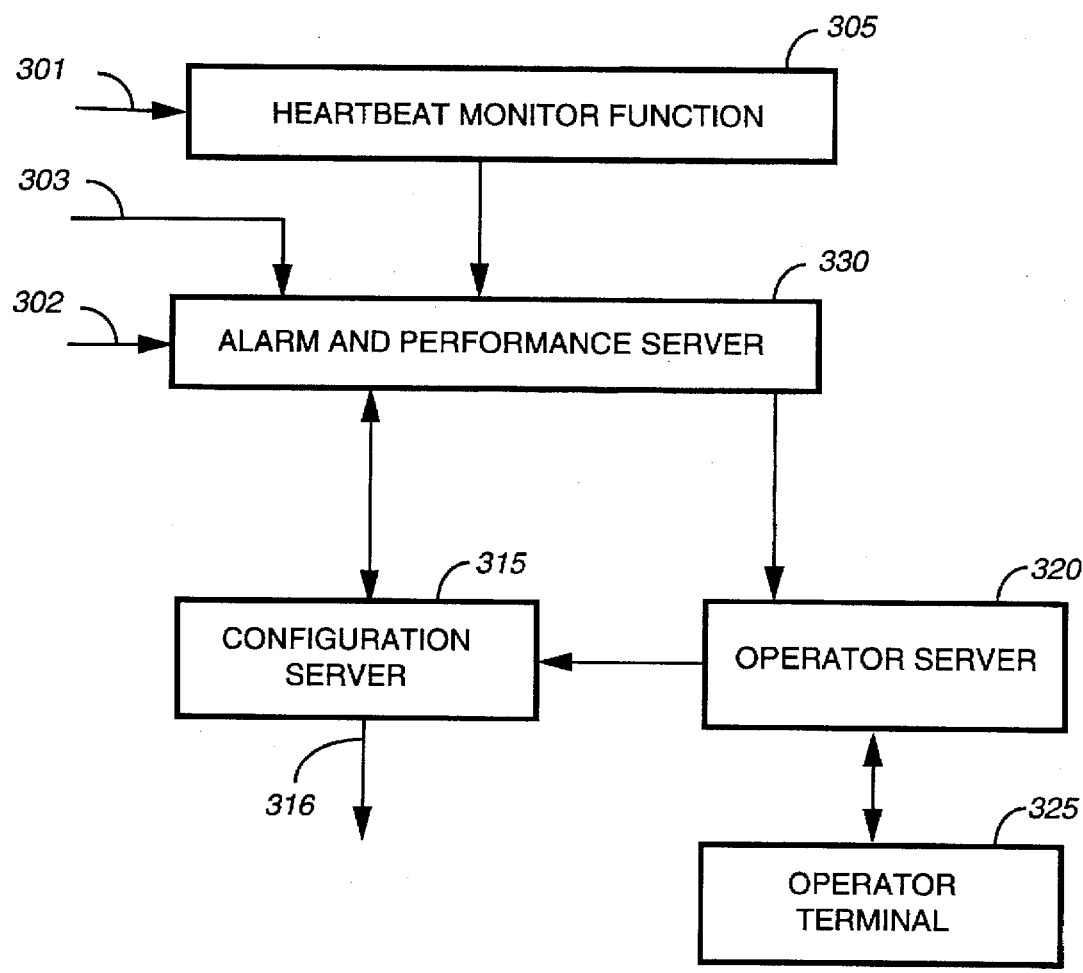
FIG. 3 is a flow chart describing the operation of a wireless messaging gateway operation and maintenance function used in the wireless messaging gateway distributed signaling system 7 call handling system shown in FIG. 2, in accordance with the preferred embodiment of the present invention.

Referring to FIG. 3, a block diagram of the operation and maintenance controller (OMC) 108 is shown, in accordance with the preferred embodiment of the present invention. The OMC 108 comprises a heartbeat monitor function 305, an alarm and performance server 330, a configuration server 315, an operator server 320, and an operator terminal 325. The heartbeat monitor 305 is coupled to the Ethernet 240 (not shown in FIG. 3) for receiving heartbeat messages 301, which are non-SS7 messages, from the monitor functions 260 of the set of N DCIs 121, and is further coupled to the alarm and performance server 330. The heartbeat monitor function 305 maintains a heartbeat timer associated with each DCI 258, which is reset when a heartbeat message is received from the associated DCI 258 over the Ethernet 240.

When a heartbeat message is not received from a DCI before the associated timer expires, the heartbeat function generates a heartbeat alarm message for the associated DCI 258, which is routed to the alarm and performance server 330.

The alarm and performance server 330 is further coupled to the set of N simultaneously active DCIs 121 via the Ethernet 240 for receiving SS7 messages 302, and to the operator server 320, the configuration server 315, the operator server 320. The alarm and performance server 330 responds to certain CCS network management messages 302, to heartbeat alarm messages, and to other hardware alarms 303. When a heartbeat alarm is received from the heartbeat monitor function and the alarm and performance server 330 determines from the configuration server 315 that no additional standby DCI's 258 are available, an operator alarm command is generated by the alarm and performance server 330. The operator server 320, which is coupled to the operator terminal 325, responds to the operator alarm command by generating an alarm that is coupled to the operator terminal 325 where it is presented to the operator as an indication on a graphical interface of the operator terminal 325. It will be appreciated that other operator sensible techniques could alternatively be used to present the alarm to an operator, such as an alarm tone or a paging message. When a heartbeat alarm is received and the alarm server determines from the configuration server (also called the configuration function) 315 that a standby DCI 258 is available, a switchover command is generated by the alarm and performance server 330 that commands the configuration server 315 to activate a currently inactive DCI 258 and configure it with 1) the signaling point code that is common to the other DCIs 258 that are active and 2) the link that had been associated with the failed DCI 258, and send a deactivation message to the failed DCI 258 from which the heartbeat has been missed.

The alarm and performance server 330 responds to CCS network management messages 302 that are changeover commands received from a remote exchange and which indicate that a link may have failed. The alarm and performance server 330 responds to the changeover commands by first directing the configuration server 315 to generate a restart command to attempt restarting the DCI 258 associated with the failed link. If this is successful in re-establishing the link, then the maintenance process is complete. If this is unsuccessful, the alarm and performance server 330 generates the switchover command as described above, resulting in the configuration and startup of the standby DCI 258 and deactivation of the DCI 258 originally associated with the failed link, as described above. The alarm function generates an alarm command which, as described above, activates an operator sensible alarm. The alarm and performance server 330 also maintains system parameter statistics, such as loss of messages, mis-sequencing of the messages, network queueing delays, and propogation delays, which are available for operator review on the operator terminal 325.

The operator server 320 includes a system start up function that responds to a startup input command received from the operator terminal 325 by instructing the configuration server 315 to configure a selected set of N DCIs 258 with the common SPC and start up the selected set of N DCIs 258.

These functions of the OMC 108 provide a high degree of fault tolerance for the WMG 102 in a simple yet effective manner.

It will be appreciated that the preferred embodiment of the present invention would provide the same advantages in a telephone network that is a private STN/SS7 instead of a public STN/SS7, and that the same advantages would be provided for a call terminating processor other than a paging call terminating processor.

In summary, the WMG 102 is a unique distributed signaling system seven (SS7) call terminating processor for processing calls received over an SS7 network that provides cost effective and incremental system growth, high link availability and fault tolerance when compared to prior art exchange processing systems, using simultaneously active, uncomplicated multiple instances of signaling system 7 level 3 network layers having common signaling point codes.

I claim:

1. A distributed signaling system seven (SS7) call terminating processor for processing calls received over an SS7 network, comprising:

a set of N simultaneously active digital channel interfaces (DCIs) sharing a common signaling point code, wherein said set of N simultaneously active digital channel interfaces receives common channel signaling messages, and wherein N is a positive integer greater than 1, and wherein each of said N simultaneously active DCIs comprises an SS7 message transfer part level one (MTPL1) physical layer coupled on a one to one basis to a common channel signaling link;

an SS7 message transfer part level two (MTPL2) link layer, coupled to said SS7 MTPL1 physical layer;

an SS7 message transfer part level three (MTPL3) network layer having the common signaling point code and coupled to said SS7 MTPL2 link layer; and an operation and maintenance controller (OMC) which comprises a configuration function that configures each SS7 MTPL3 network layer in said set of N simultaneously active DCIs to have the common signaling point code.

2. The distributed SS7 call terminating processor according to claim 1, wherein each of said N simultaneously active DCIs further comprises an SS7 monitor function which generates a periodic heartbeat message, and wherein the OMC further comprises an alarm function which responds to a lack of reception of a heartbeat message from one of said set of N simultaneously active DCIs.

3. The distributed SS7 call terminating processor according to claim 2, wherein the response is an operator sensible alert.

4. The distributed SS7 call terminating processor according to claim 2, wherein the response is a reconfiguration of an inactive DCI to be active and to have the common signaling point code.

5. The distributed SS7 call terminating processor according to claim 1, wherein the OMC further comprises an alarm function which responds to an SS7 network management message received from a remote signal transfer point by reconfiguring an inactive DCI to be active and have the common signaling point code.

* * * * *